Aug. 10, 1937.  J. W. WELSH  2,089,235
METHOD OF MAKING OPHTHALMIC MOUNTINGS
Filed Dec. 20, 1934
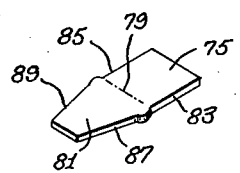
Fig. 1.
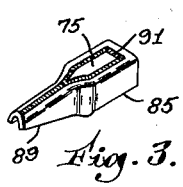
Fig. 2.
Fig. 3.
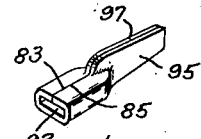
Fig. 4.
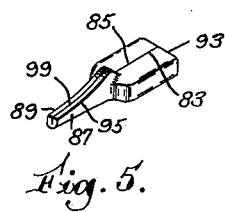
Fig. 5.
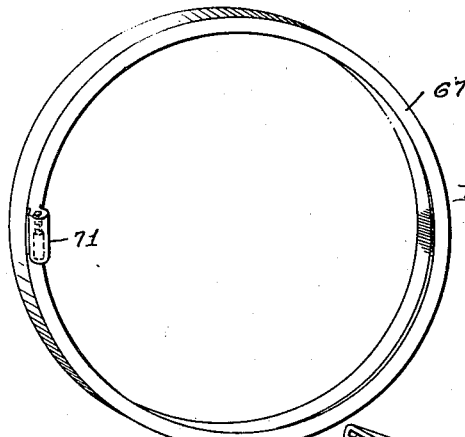
Fig. 6.
Fig. 7.
Fig. 9.
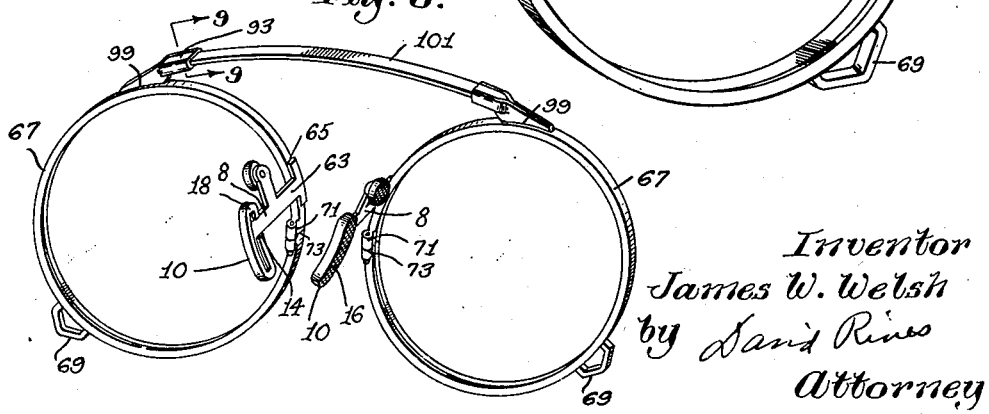
Fig. 8.
Inventor
James W. Welsh
by David Rines
Attorney Patented Aug. 10, 1937

2,089,235

UNITED STATES PATENT OFFICE 2,089,235

METHOD OF MAKING OPHTHALMIC MOUNTINGS

James Wilson Welsh, Providence, R. I., assignor to The Welsh Manufacturing Company, Providence, R. I., a corporation of Rhode Island Application December 20, 1934, Serial No. 758,392

2 Claims. (Cl. 29—20)

The present invention relates to methods of making ophthalmic mountings.

An object of the invention is to provide a novel joint between a lens-receiving rim and the bridge of an ophthalmic mounting.

Other and further objects will be explained hereinafter and will be particularly pointed out in the appended claims.

The invention will now be explained in connection with the accompanying drawings, in which Fig. 1 is a perspective of a blank for making a novel joint according to the present invention; Figs. 2 to 5 illustrate steps in the manufacture of said joint; Fig. 6 illustrates a rim to which the joint and other parts may be secured; Fig. 7 illustrates the same rim at a later stage of manufacture; Fig. 8 is a perspective of an ophthalmic mounting embodying the present invention; and Fig. 9 is a section of the same, taken upon the line 9—9 of Fig. 8.

A nose rest 10 may be composed of some non-metal material, like celluloid, unbacked by any reinforcing or supporting member, such as metal. Each nose rest 10 is provided with an opening 14 extending, in the direction of the thickness dimension of the nose rest, from the inner face 18 of the nose rest, inward a substantial distance toward the outer face 16, as illustrated more particularly in Fig. 8. A metal arm 8 has integral therewith a metal member 20, preferably, long and narrow, that is inserted in the opening 14. Several nose guards are illustrated as mounted on a single guard arm 63 that is soldered or welded at 65 to a rim 67. The rim 67 is originally continuous, and has later welded or soldered to it a chain-receiving eye 69, an interiorly threaded lug 71, through which and the rim a cut 73 is later made, and a bridge-receiving box, which latter will now be described.

It is made from a metal blank having substantially a rectangular portion 75 and a trapezoidal portion 81, one side 79 of the rectangle forming the larger base of the trapezoid. The sides 83 and 85 of the rectangle, adjacent to the base 79, are bent into U-shaped form, as illustrated in Fig. 2, and the non-parallel sides 87 and 89 are similarly bent into U-shaped form, but with a narrower U. The bottom of the resulting product may be suitably engraved or stamped, as shown at 91, after which the arms 83 and 85 are bent into the form of a box, as shown at 93. The arms 87 and 89 are pressed into contact with each other, as shown at 95. The surface 97 is next trimmed into the curved shape shown at 99, so as to conform to the curvature of the rim 67. The trimmed surface 99 is then welded to the rim, as before discussed, and illustrated in Fig. 7.

One end of a spring bridge 101 is fixed in the box 93 by indenting the wall of the box and the said bridge end with any suitable tool, as shown at 103.

Modifications will occur to persons skilled in the art, and all such are considered to fall within the spirit and scope of the invention as defined in the appended claims.

What is claimed is:

1. A method of making an ophthalmic mounting that comprises providing a blank having substantially a rectangular portion and a trapezoidal portion, one side of the rectangle forming the larger base of the trapezoid, bending the sides of the rectangle adjacent to the said base into U-shaped form, bending the non-parallel sides of the trapezoid into U-shaped form, shaping the arms of the first-named U to form a box, and forcing the arms of the second-named U into contact with each other.

2. A method of making an ophthalmic mounting that comprises providing a blank having substantially a rectangular portion and a trapezoidal portion, one side of the rectangle forming the larger base of the trapezoid, bending the sides of the rectangle adjacent to the said base into U-shaped form, bending the non-parallel sides of the trapezoid into U-shaped form, shaping the arms of the first-named U to form a box, forcing the arms of the second-named U into contact with each other, inserting a bridge in the box, and forming an indentation in a wall of the box and in the bridge to secure the bridge in the box.

JAMES W. WELSH.